United States Patent
Ando et al.

(10) Patent No.: US 8,626,341 B2
(45) Date of Patent: Jan. 7, 2014

(54) APPARATUS AND METHOD FOR ADJUSTING PARAMETER OF IMPEDANCE CONTROL

(75) Inventors: Shingo Ando, Kitakyushu (JP); Ryoichi Nagai, Kitakyushu (JP); Yasuyuki Inoue, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 432 days.

(21) Appl. No.: 12/907,946

(22) Filed: Oct. 19, 2010

(65) Prior Publication Data

US 2011/0093120 A1    Apr. 21, 2011

(30) Foreign Application Priority Data

Oct. 20, 2009  (JP) ................................. 2009-241324

(51) Int. Cl.
*B25J 13/00* (2006.01)
*B25J 15/00* (2006.01)
*G05B 15/00* (2006.01)

(52) U.S. Cl.
USPC ............................... 700/260; 901/34; 901/11

(58) Field of Classification Search
USPC ............ 700/245, 250, 251, 260–263; 901/11, 901/14–16, 34, 41
See application file for complete search history.

(56) References Cited

U.S. PATENT DOCUMENTS

| | | | |
|---|---|---|---|
| 6,539,292 B1 * | 3/2003 | Ames, Jr. .......................... 701/19 |
| 7,652,446 B2 * | 1/2010 | Lin et al. ......................... 318/650 |
| 2004/0230325 A1 | 11/2004 | Ramamoorthy et al. | |
| 2006/0195236 A1 * | 8/2006 | Katsuta et al. ................... 701/19 |
| 2008/0253752 A1 * | 10/2008 | Lin et al. ......................... 388/824 |
| 2011/0178638 A1 * | 7/2011 | Tsusaka et al. ................ 700/257 |

FOREIGN PATENT DOCUMENTS

JP    2001-277162    10/2001

OTHER PUBLICATIONS

Toshio Tsuji et al., Neural Network Learning of Robot Arm Impedance in Operation Space, Apr. 1996, IEEE Transactions.*
Extended European Search Report for corresponding EP Application No. 10185835.5-1239, Feb. 6, 2012.

* cited by examiner

*Primary Examiner* — Jason Holloway
(74) *Attorney, Agent, or Firm* — Ditthavong Mori & Steiner, P.C.

(57) ABSTRACT

An apparatus has a parameter initial value calculator, a force reference impression part, an evaluation data measurement part, an allowable value setting part, a viscosity parameter calculator, an end determining part, and an inertia parameter adjusting part. The force reference impression part intermittently supplies a force reference to an impedance controller. The evaluation data measurement part measures setting time of time response, an overshoot amount, and the number of vibration times. The allowable value setting part sets allowable values of the overshoot amount and the setting time. The viscosity parameter calculator calculates a viscosity parameter with which the setting time becomes shortest. The end determining part determines the end or continuation of the process by comparing the adjustment values with the allowable values. The inertia parameter calculator adjusts the inertia parameter according to the adjustment values of the overshoot amount and the setting time.

8 Claims, 10 Drawing Sheets

APPARATUS AND METHOD FOR ADJUSTING PARAMETER OF IMPEDANCE CONTROL

CROSS-REFERENCE TO RELATED APPLICATIONS

The present application claims priority under 35 U.S.C. §119 to Japanese Patent Application No. 2009-241324 filed Oct. 20, 2009. The contents of the application are incorporated herein by reference in their entirety.

BACKGROUND OF THE INVENTION

1. Field of the Invention

The present invention relates to an apparatus and method for adjusting parameters of impedance control based on information of a force sensor provided for an end effector of an industrial robot.

The impedance control denotes a control on a position and a force for setting mechanical impedances (inertia, damping coefficient, and rigidity) which are generated in the case where a force is applied from the outside to the end of a robot to values convenient to a target work.

2. Discussion of the Background

There is a widely known technique that, in the case of executing a contact work such as mating by using an industrial robot, a force sensor is attached to an end effector or a wrist part of a robot manipulator, and force control using information of the force sensor is performed. As a force control method, for example, impedance control is easily used.

In the impedance control, feedback control is performed so that a response of a position when an external force acts on an end effector is obtained according to desired inertia, viscosity, and rigidity characteristics. By the control, a force generated when workpieces (objects to be worked) come into contact with each other at the time of a mating operation is passed off, and a positional error can be absorbed. However, if the parameters such as inertia, viscosity, and rigidity are improper, it may take an extremely long time to execute the operation. There is a case that a control system becomes unstable (oscillates) at the time of contact and the operation cannot be performed. Consequently, the parameters of the impedance control have to be properly adjusted.

Japanese Unexamined Patent Application Publication No. 2001-277162 discloses a technique of adjusting parameters of the impedance control.

In the publication, an adjustment worker (teacher) adjusts behavior designation parameters of weight (heavy and light) and hardness (hard and soft) by a button operation while recognizing a force response on a display unit and, based on the behavior designation parameters, adjusts impedance parameters by the fuzzy inference.

SUMMARY OF THE INVENTION

According to one aspect of the present invention, there is provided an apparatus for adjusting parameters of impedance control based on information of a force sensor provided for an end effector of a robot manipulator, the apparatus including:

a parameter initial value calculator for calculating initial values of an inertia parameter and a viscosity parameter which are set at the time of parameter adjustment;

a force reference impression part for intermittently supplying a stepwise force reference to impedance control, thereby repeatedly pressing a workpiece held by the end effector against a target workpiece;

an evaluation data measurement part for recording time response of a force feedback from the force sensor each time the workpiece is pressed and automatically measuring setting time of the time response of the force feedback, an overshoot amount, and the number of vibration times;

an allowable value setting part for setting an overshoot amount allowable value as a maximum value of an allowable overshoot amount and a setting time allowable value as a maximum value of allowable setting time;

a viscosity parameter calculator for calculating a viscosity parameter with which the setting time is shortest by executing the repetitive pressing while fixing the inertia parameter;

an end determining part for determining whether the repeating process is finished or continued by comparing the setting time adjustment value and the overshoot amount adjustment value obtained from the evaluation data measurement part as a result of calculation of the viscosity parameter by the viscosity parameter calculator with the allowable values; and an inertia parameter calculator, in the case where the end determining part determines that the repeating process is continued, for increasing/decreasing the inertia parameter or lessening either the overshoot amount allowable value or the setting time allowable value and for re-executing the viscosity parameter calculator.

According to another aspect of the present invention, there is provided a method for adjusting parameters of impedance control based on information of a force sensor provided for an end effector of a robot manipulator by repeatedly measuring time response of a force feedback, the method including:

a step of calculating initial values of an inertia parameter and a viscosity parameter which are set at the time of parameter adjustment;

(a) an allowable value setting step of setting an overshoot amount allowable value (upper limit) and a setting time allowable value (upper limit) related to the time response of the force feedback;

(b) a viscosity parameter calculating step of calculating a viscosity parameter with which the setting time is shortest while fixing the inertia parameter;

(c) an end determining step of determining whether the repeating process is finished or continued by comparing the overshoot amount adjustment value and the setting time adjustment value obtained from a result of execution of the viscosity parameter calculating step with the allowable values; and (d) an inertia parameter adjusting step, in the case where continuation of the process is determined in the end determining step, of increasing/decreasing the inertia parameter or lessening either the overshoot amount allowable value or the setting time allowable value and of re-executing the viscosity parameter calculating step.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
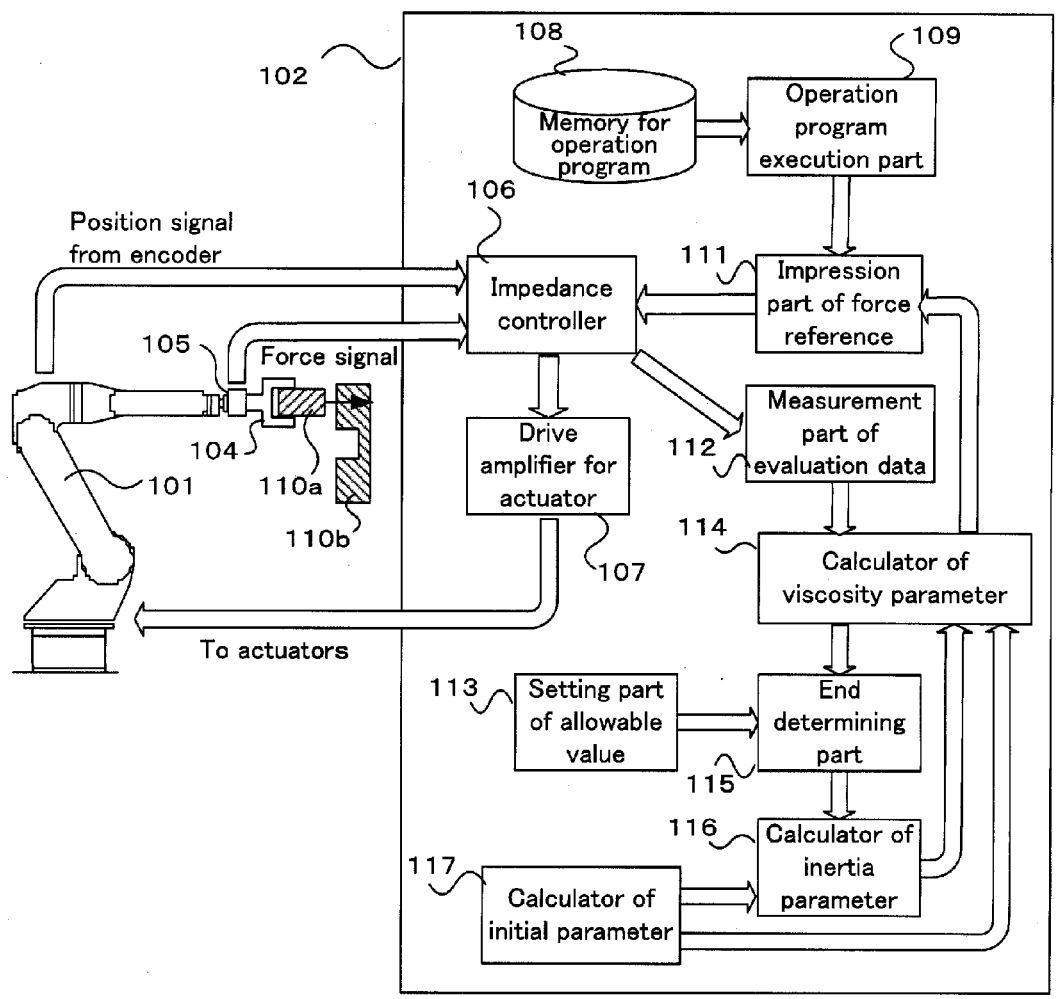
FIG. 1 is a configuration diagram of an impedance control parameter adjusting apparatus according to the present invention.

Embodiments will now be described with reference to the accompanying drawings, wherein like reference numerals designate corresponding or identical elements throughout the various drawings.

Embodiments of the present invention will be described below with reference to the drawings.

First, a system configuration of a general industrial robot and impedance control and, after that, techniques related to the present invention will be described.

Figure 7:
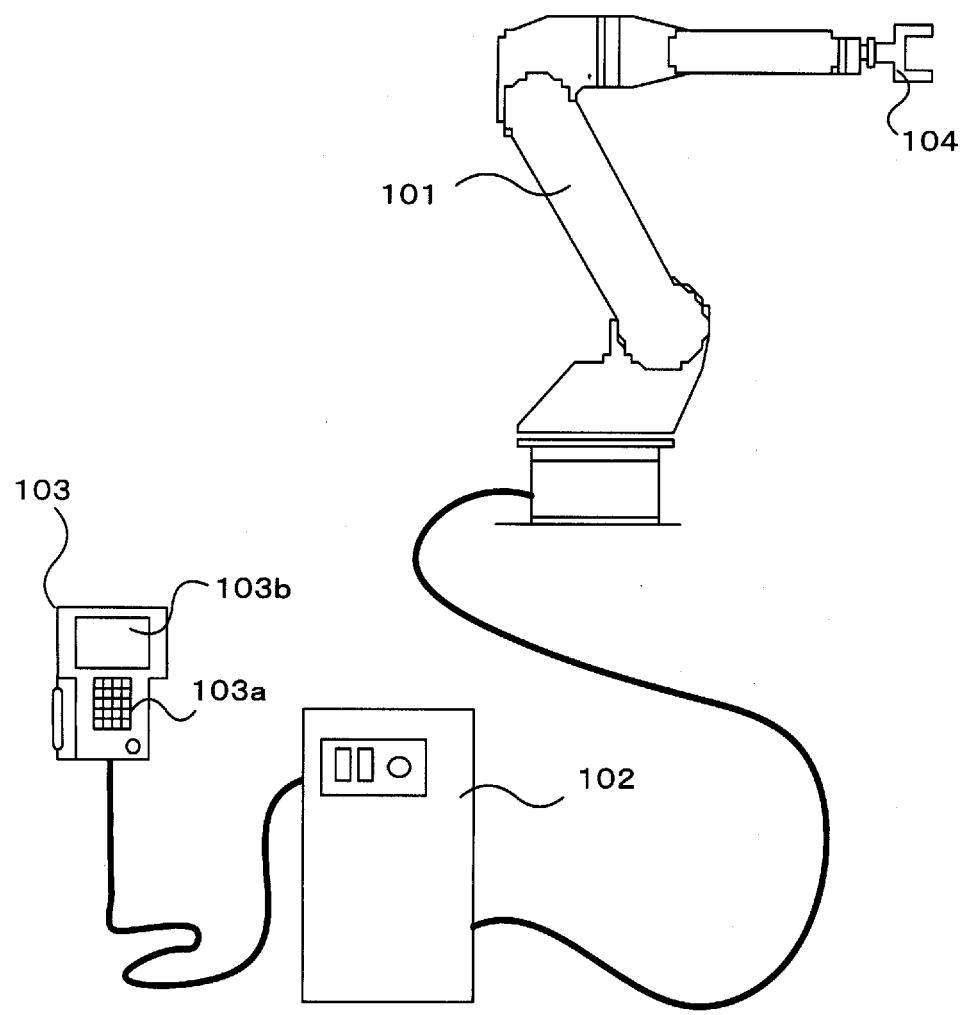
FIG. 7 is a configuration diagram of an industrial robot of the present invention.

FIG. 7 is a configuration diagram of a general industrial robot. The configuration diagram shows a manipulator, a controller, and a portable teaching operation panel. In FIG. 7, a robot 101 is a manipulator having a plurality of joint axes and links. In each of the joint axes, a drive motor with an encoder is provided. The axes can be driven independently of each other. A controller 102 for the robot 101 is an apparatus for performing a feedback control (positional control system) based on an encoder signal of each of the joint axis drive motors and for controlling motion of the robot 101. A portable teaching operation panel 103 is an interface used by the teacher to manually (JOG) operate the robot and to create and edit an operation program. The portable teaching operation panel 103 has, mainly, an operation button group 103a and a display screen 103b. An end effector 104 is provided at the wrist of the robot 101. To the end effector, various tools are attached according to applications. In the case of FIG. 7, a hand (gripper) for gripping a part is attached.

Figure 8:
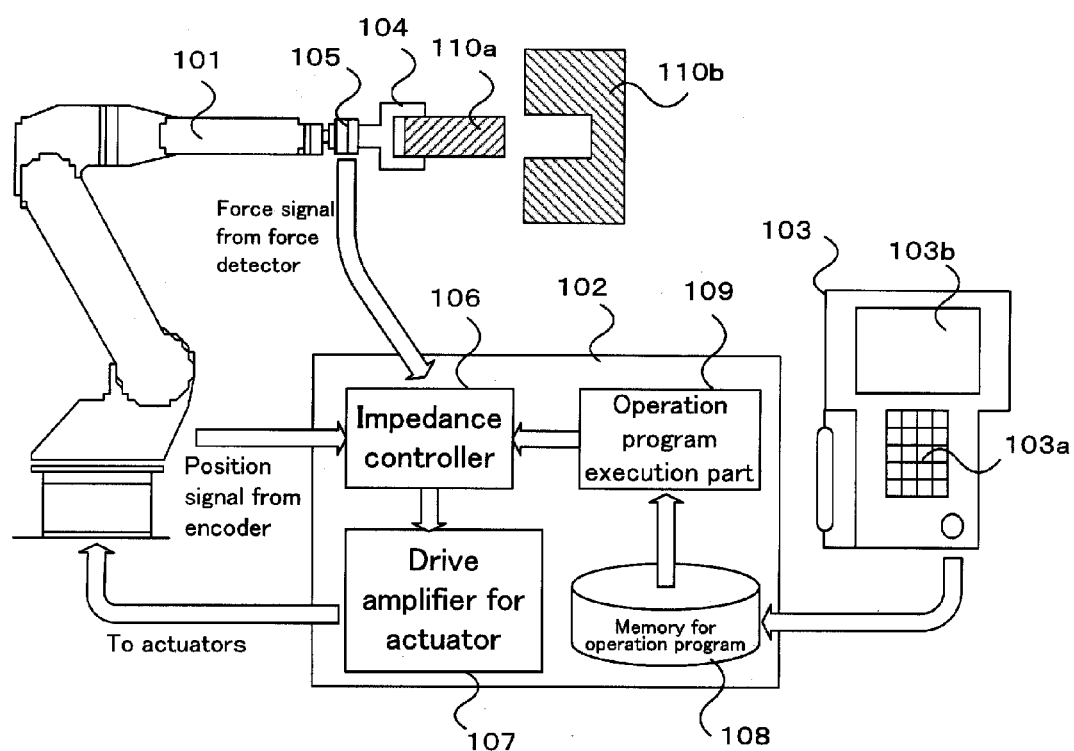
FIG. 8 is a configuration diagram of an industrial robot which is impedance controlled according to the present invention.

FIG. 8 is a configuration diagram of an industrial robot which is impedance controlled. A six-axis force sensor 105 is attached to the wrist of the robot 101. The six-axis force sensor can measure forces in the X, Y, and Z-axis directions and moments about the axes. An impedance controller 106 is constructed in the controller 102. The impedance controller 106 is used to perform a feedback control system based on signals from the force sensor 105 and the axis encoders. From the impedance controller 106, a torque reference or a current reference of each of the drive motors is outputted to a drive amplifier 107 for an actuator. Based on the torque (or current) reference value, the drive amplifier 107 for the actuator supplies power to each of the drive motors. A memory 108 for an operation program stores an operation program created (taught) by the portable teaching operation panel in the controller. An operation program execution part 109 interprets/executes the operation program stored in the memory 108 for the operation program and gives an operation reference to the impedance controller 106. There are provided a workpiece 110a (for example, a mating part) gripped by the end effector 104 and a target workpiece 110b (for example, a part to be mated). In a mating work as an example, by setting the robot 101 in an impedance control state and properly adjusting the parameters, position and orientation errors are allowed and the parts can be mated with each other.

Figure 9:
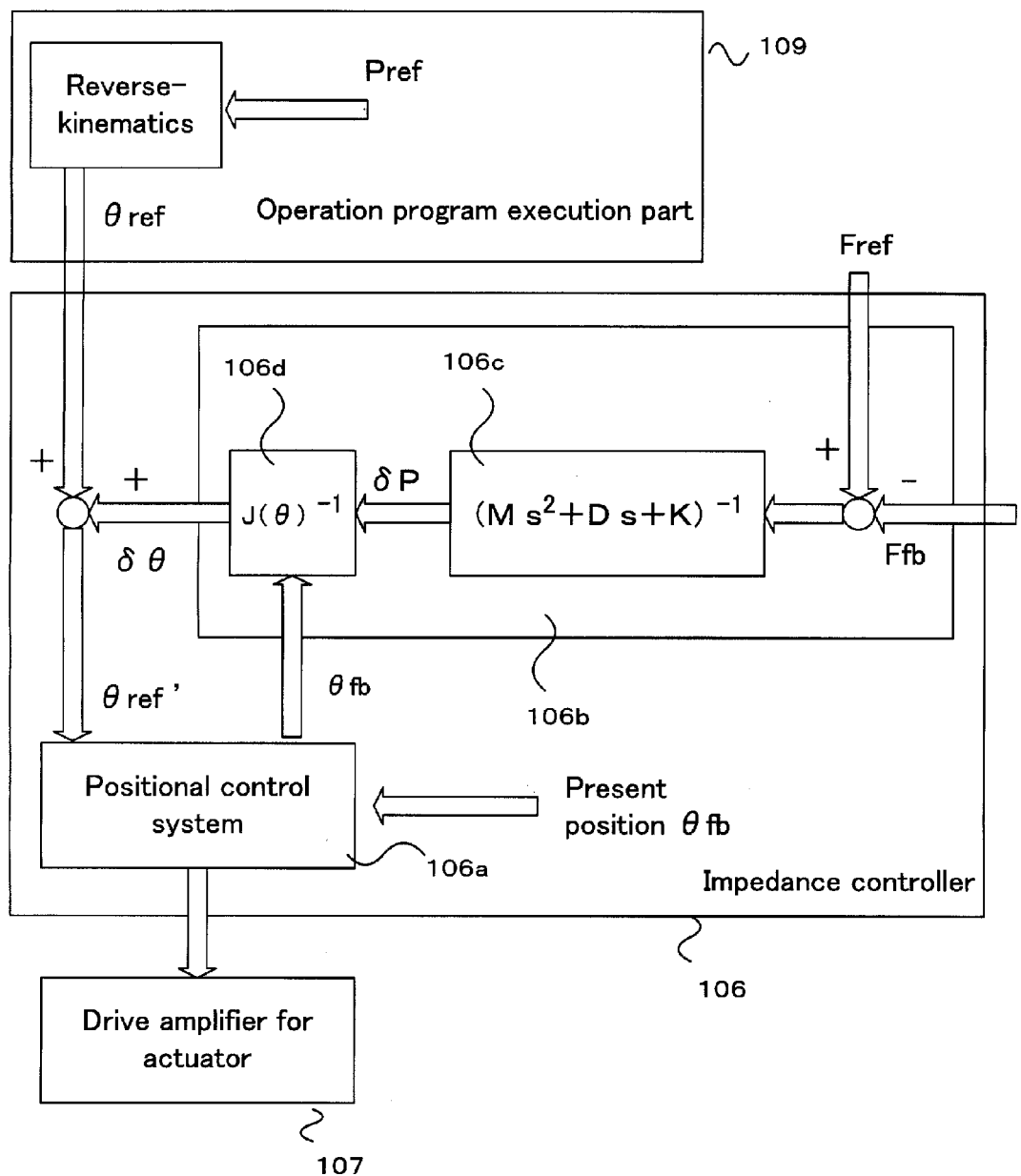
FIG. 9 is a block diagram of the impedance control of the present invention.

FIG. 9 is a control block diagram of the impedance control. In FIG. 9, a positional control system 106a outputs a torque (or current reference) of each of the drive motors to the drive amplifier 107 for the actuator based on the position reference of each joint axis and a present position (feedback). Fref indicates a force moment reference (force moment target value), and Ffb indicates a force moment feedback value. θref indicates a position reference (joint coordinate system) sent from the operation program execution part 109, and δθ indicates a position correction amount calculated by an impedance control operation part 106b. In the impedance control operation part 106b, first, based on Fref and Ffb, a position correction amount δP in an orthogonal coordinate system is calculated in accordance with the following equation (impedance model 106c).

$$\delta P = (Ms^2 + Ds + K)^{-1}(Fref - Ffb) \quad (1)$$

Where M, D, and K denote an inertia matrix, a viscosity coefficient matrix, and a rigidity matrix (spring constant), respectively. Usually, using those as diagonal matrixes, impedance characteristics independent of one another in the different axis directions are set. Here, "s" denotes a Laplace operator and corresponds to a first derivation related to time.

The position correction amount δP in the orthogonal coordinate system is broken down to a position correction amount δθ in the joint coordinate system by the following equation using a Jacobian matrix J(θ) (velocity resolution operation unit 106d).

$$\delta\theta = J(\theta)^{-1}\delta P \quad (2)$$

By giving a position reference θref' obtained by adding δθ to θref to the positional control system 106a, the robot operates while maintaining the characteristics designated by M, D, and K to an external force and a moment. For example, when the robot operates like a spring in response to an external force by the rigidity matrix K, by reducing the inertia matrix M and the viscosity coefficient matrix D, the robot operates lightly and smoothly.

The present invention relates to the technique of adjusting the inertia M and the viscosity D in the three parameters.

Figure 5A:
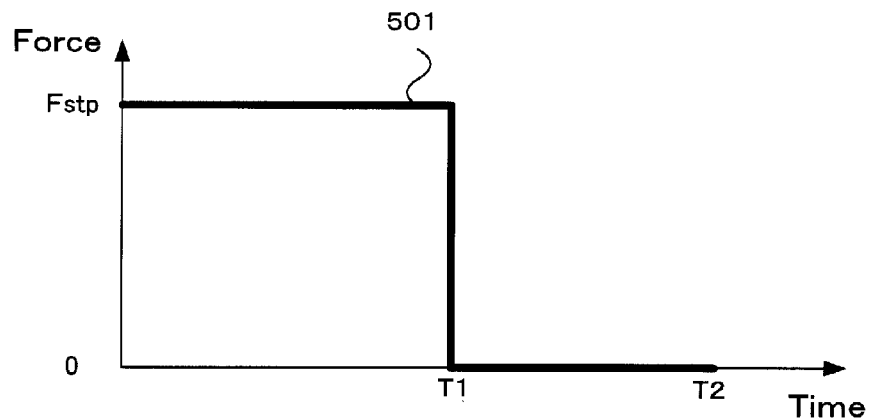
FIG. 5A shows an example of a force reference which is outputted from an impression part of force reference of the present invention.

FIG. 1 is a configuration diagram of an impedance control apparatus according to the present invention. The apparatus in FIG. 1 is roughly divided into the robot 101 and the controller 102. In FIG. 1, an impression part 111 of a force reference repeatedly intermittently supplies a stepwise force reference to the impedance controller 106. FIG. 5A shows an example (501) of a force reference which is outputted from the impression part 111 of the force reference. A force reference having a force Fstp and a predetermined time (T1) is outputted and, after that, the force reference is reset to zero. By repeatedly giving the force reference in the direction of the target workpiece 110b, the workpiece 110a to be gripped can be repeatedly pressed against the target workpiece 110b.

A measurement part 112 of evaluation data records time response (force response) of a force sensor feedback each time the pressing operation is performed, and automatically measures setting time, an overshoot amount, and the number of vibration times as evaluation data values for parameter adjustment from the time response.

Figure 5B:
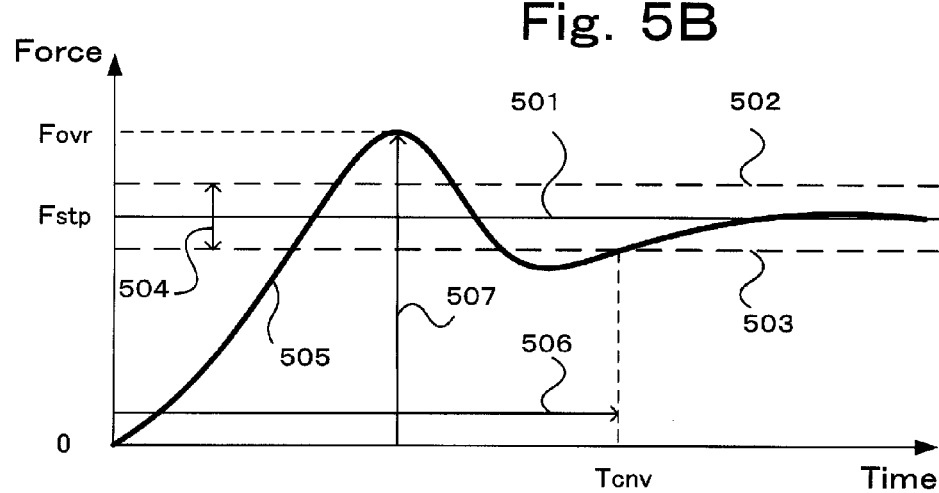
FIG. 5B shows principles of measuring evaluation data values of the present invention together with a state of force response setting time and a state of an overshoot amount.
Figure 5C:
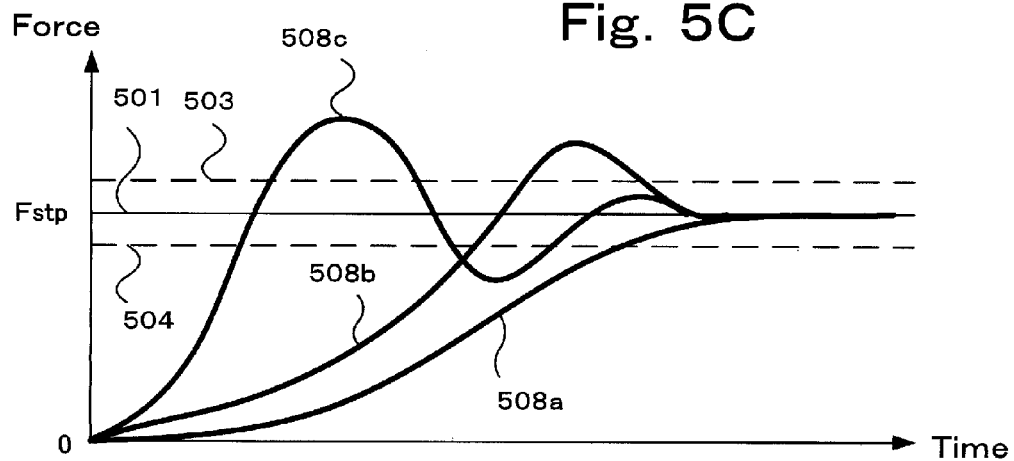
FIG. 5C shows principles of measuring evaluation data values of the present invention together with a state of force response setting time, an overshoot amount, and the number of vibration times.

FIGS. 5B and 5C show principles of measuring the evaluation data values. For the setting time, first, an upper limit value 502 and a lower limit value 503 are determined for a stepwise force reference 501, and a setting range 504 is provided. Time 506 at which a force response 505 starts converging in the setting range 504 (enters the setting range and does not come out later) is setting time. As the overshoot amount, a value 507 at which the force response 505 exceeds the stepwise force reference and becomes the maximum is set. As the number of vibration times, the number of times the force response goes out of the setting range 504 is counted. Note that, only in the case where the force response exceeds the upper limit value 502 and the lower limit value 503 alternatively, the number of times is counted.

In the case of a force response 508a in FIG. 5C, it does not exceed the upper limit value 502 even once, so that the number of vibration times is zero. In the case of a force response 508b, after it exceeds the upper limit value 502 once, it is converged in the setting range 504 and does not go below the lower limit value 503, so that the number of vibration times is once. In the case of a force response 508c, it exceeds the upper limit value 502, passed through the setting range 504, goes below the lower limit value 503, and is set, so that the number of vibration times is two.

In FIG. 1, a setting part 113 of an allowable value sets allowable values for setting time and an overshoot amount. A calculator 114 of a viscosity parameter calculates a viscosity parameter D at which the setting time becomes the minimum in the repetitive pressing process in a state where the inertia parameter M is fixed. The details of the calculating method will be described later. An end determining part 115 determines whether the adjusting process is finished or continued by comparing the setting time (setting time adjustment value) obtained by a result of the viscosity parameter calculation and an overshoot amount (overshoot amount adjustment value) with the setting time allowable value and the overshoot amount allowable value which are set by the setting part 113 of allowable value. The method of determining the end will be described later. A calculator 116 of an inertia parameter changes the value of the inertia parameter M when the end determining part 115 determines that the parameter adjusting process continues. After the calculator 116 of the inertia parameter changes the inertia parameter, the calculator 114 of the viscosity parameter is re-executed. Until the end determining part 115 determines the end, the calculator of the viscosity parameter and the calculator of the inertia parameter are repeatedly executed.

A calculator 117 of an initial parameter calculates initial values of an inertia parameter and a viscosity parameter which are set at the time of parameter adjustment from weights of the end effector which is set and a gripped workpiece and a band of a positional control system of the robot manipulator.

According to the present invention as described above, only by setting the weights of the end effector and a gripped workpiece and the band of the positional control system of the robot manipulator by the calculator of the initial parameters and setting allowable values of the setting time and the overshoot amount by the setting part of allowable values, the calculator of the viscosity parameter, the end determining part, and the calculator of the inertia parameter repeatedly execute adjustment of the viscosity parameter and the inertia parameter based on clear evaluation data. There is, consequently, an effect that a plurality of parameters can be adjusted without depending on skills of individuals and without special knowledge.

Figure 2:
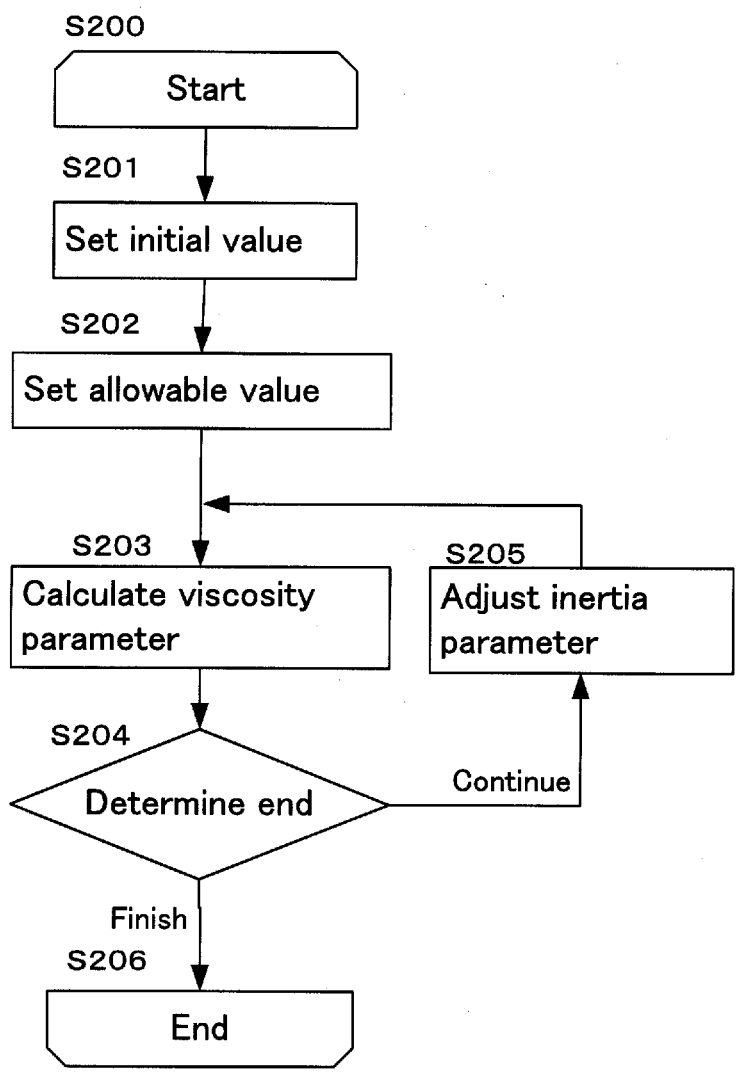
FIG. 2 is a flowchart of an impedance control parameter adjusting method according to the present invention.

FIG. 2 is a flowchart of a method of adjusting parameters of the impedance control according to the present invention.

In FIG. 2, in S201, initial values of the inertia parameter M and the viscosity parameter D of the impedance control are set in a coordinate axis direction of adjustment (pressing operation). In S202, allowable values of setting time of a force response and the overshoot amount are set. In S203, by executing the repetitive pressing operation in a state where the inertia parameter M is fixed, the viscosity parameter with which the setting time of the force response becomes minimum is calculated. In S204, whether the process is continued or finished is determined by comparing the setting time (setting time adjustment value) and the overshoot amount (overshoot amount adjustment value) obtained as a result of the calculation of the viscosity parameter. When it is determined in S204 that the process is continued, the inertia parameter is adjusted (finely adjusted) in S205, the flow returns to S203 and the viscosity parameter is re-calculated. The series of processes in S203 to S205 are repeatedly executed until the end is determined in S204.

Next, the details of the method of calculating the viscosity parameter in S203 will be described.

Figure 3:
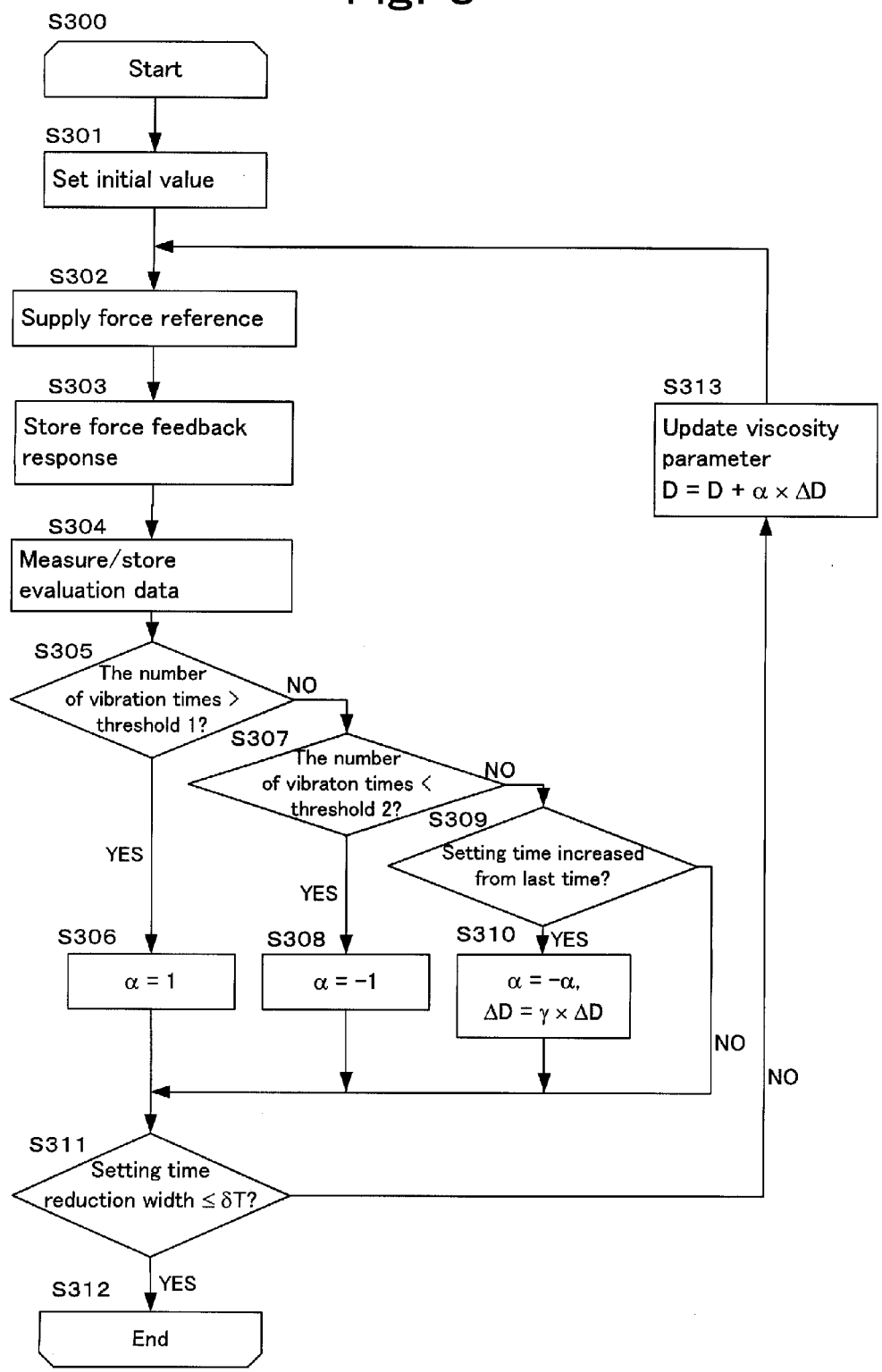
FIG. 3 is a flowchart of a viscosity parameter calculating process of the present invention.

FIG. 3 shows a detailed flowchart of the viscosity parameter calculation S203.

In FIG. 3, in S301, initial values of the force Fstp of the force reference value 501, impression time T1 and T2, calculation width $\Delta D$ of the viscosity parameter D, calculation direction coefficient $\alpha$ (1 or $-1$), a decrease ratio $\gamma$ of the calculation width (less than 1), and a diminution threshold $\delta T$ of the setting time are set. In S302, the stepwise force reference 501 is supplied to the impedance controller 106 as shown in FIG. 5A. In S303, the time response (force response) of the force sensor feedback is recorded (measured and stored). In S304, as shown in FIGS. 5B and 5C, the setting time, the overshoot amount, and the number of vibration times are automatically measured with respect to the recorded force response.

In S305, whether the automatically measured number of vibration times exceeds a preset threshold 1 (for example, 2) or not is determined. If the number of vibration times exceeds the threshold 1, the calculation direction coefficient $\alpha$ is set (incremented) to 1 (S306). If the number of vibration times is equal to or less than the threshold 1, whether the number of vibration times is below a preset threshold 2 (for example, 1) or not is determined in S307. If the number of vibration times is below the threshold 2, the calculation direction coefficient $\alpha$ is set (decremented) to $-1$ (S308). When the number of vibration times is large (exceeds the threshold 1), it is considered that the control system at the time of pressing has an insufficient damping. Consequently, it means that the viscosity parameter D is increased at the next pressing. When the number of vibration times is small (below the threshold 2), it is considered that the control system at the time of pressing has an over damping. Consequently, it means that the viscosity parameter is decreased at the next pressing.

If the number of vibration times is equal to or larger than the threshold 2 and equal to or less than the threshold 1, whether the setting time has increased more than that in the pressing of last time or not is determined in S309. If the setting time has increased, the sign of the calculation direction coefficient $\alpha$ is inverted and, further, a value obtained by multiplying the calculation width $\Delta D$ with the damping rate $\gamma$ is re-set as the new calculation width $\Delta D$ (S310).

Next, whether or not the diminution of the setting time since the pressing of last time is equal to or less than the threshold δT is determined in S311. If the diminution of the setting time is equal to or less than the threshold δT, it is considered that the setting time has sufficiently decreased, and the process is finished (S312). If the diminution of the setting time exceeds the threshold δT, the viscosity parameter D is updated based on the following equation in S313.

$$D(\text{updated value}) = D(\text{value at present}) + \alpha \times \Delta D \quad (3)$$

After updating the viscosity parameter D, the flow returns to S302, the force reference is given again, and the above-described processes are repeated.

Figure 6:
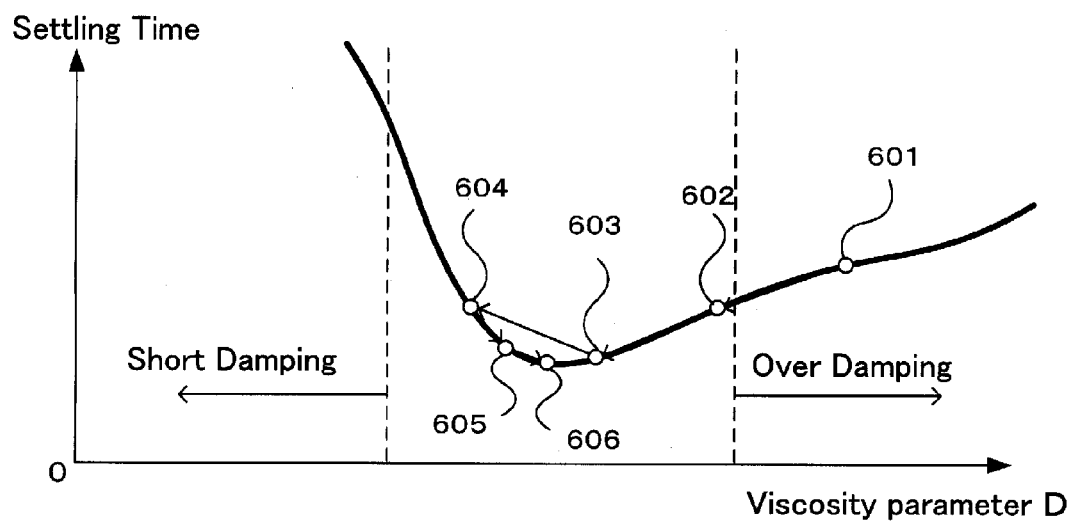
FIG. 6 shows a state where calculation of a viscosity parameter of the present invention advances.

FIG. 6 schematically shows a state where the above-described viscosity parameter calculation advances. In FIG. 6, the horizontal axis represents the viscosity parameter, and the vertical axis represents a relation of the setting time when the pressing is executed with the viscosity parameter. As shown in the diagram, it is considered that an optimum viscosity parameter at which the setting time becomes minimum exists, and the local minimal value does not exist. Symbols 601 to 606 indicate the calculation order. Symbol 601 indicates the viscosity parameter and the measured setting time at the time of the first pressing. Symbol 602 indicates the second time, and symbol 603 indicates the third time (the subsequent numbers indicate similarly). In the pressing of the first time, the number of vibration times is less than the threshold 2 and the damping is excessive. Consequently, the calculation direction coefficient α is set to −1, and the pressing of the second and third times is executed. In this case, the pressing is executed by decreasing the viscosity parameter D only by the initially set calculation width ΔD. Although the setting time decreases until the third times, it starts increasing at the fourth time. In the case where the setting time starts increasing, the sign of the calculation direction coefficient α is inverted, and the calculation width ΔD is multiplied with the decrease ratio (for example, 0.3). Consequently, at the fifth time and subsequent times, as shown in FIG. 6, the calculation is advanced with a calculation width finer than that up to the fourth time in the direction of increasing D (α=1). As obviously understood from the diagram, by repeating such a process, the calculation is gradually converged to a state where the setting time is the minimum. When the diminution of the setting time becomes equal to or less than the threshold δT, the calculation is finished (depending on setting of the threshold δT, the calculation is finished at the sixth time).

Even in the case where the damping is insufficient (the number of vibration times>threshold 1), the above-described calculating process similarly functions and the viscosity parameter with which the setting time becomes the minimum can be calculated.

The details of the viscosity parameter calculating process have been described with reference to FIG. 3. Next, the details of the end determination in S204 and the inertia parameter adjustment in S205 in FIG. 2 will be described.

Figure 4:
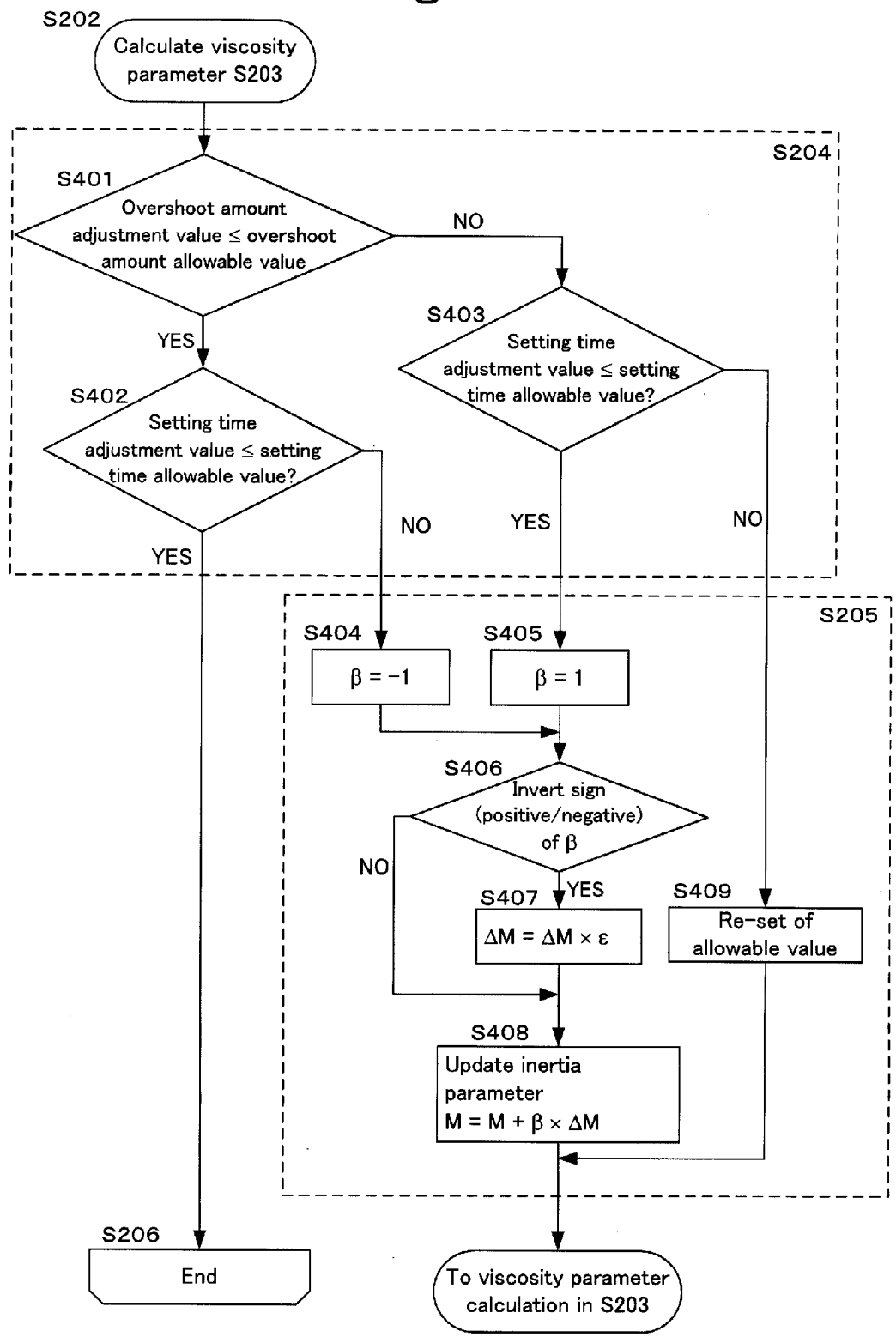
FIG. 4 is a flowchart of an end determining process and an inertia parameter calculating process of the present invention.

FIG. 4 is a detailed flowchart of the end determination in S204 and the inertia parameter adjustment S205.

In FIG. 4, ranges indicated by broken lines correspond to S204 and S205. First, the details of the end determination S204 will be described. In S401, whether the adjustment value of the overshoot amount obtained as a result of the viscosity parameter calculation in S203 (FIG. 2) is equal to or less than the overshoot amount allowable value which is set in S202 or not is determined. If the adjustment value is equal to or less than the allowable value, in S402, whether the setting time adjustment value is equal to or less than the setting time allowable value or not. If both the overshoot amount and the setting time are equal to or less than the allowable values, it is determined that proper adjustment is performed, and the process is finished (S206). If the overshoot amount adjustment value is equal to or less than the allowable value but the setting time adjustment value exceeds the allowable value, the inertia parameter M is too large, so that the calculation direction coefficient β of the inertia parameter is set to −1 (S404).

On the other hand, also in the case where it is determined in S401 that the overshoot amount adjustment value exceeds the allowable value, similarly, whether the setting time adjustment value is equal to or less than the allowable value or not is determined (S403). If the overshoot amount adjustment value exceeds the allowable value and the setting time adjustment value is equal to or less than the allowable value, the inertia parameter M is too small, so that the calculation direction coefficient β of the inertia parameter is set to 1 (S405). In S406, whether the sign (positive/negative) of the calculation direction coefficient β has been changed or not is determined. If the sign is changed (inverted), a value obtained by multiplying the decrease ratio ε (less than 1) with the calculation width ΔM of the inertia parameter is re-set as a new calculation width ΔM (S407). That is, the inertia parameter is updated based on the following equation in S408, and the flow returns to the viscosity parameter calculation S203.

$$M(\text{updated value}) = M(\text{value at present}) + \beta \times \Delta M \quad (4)$$

On the other hand, if both of the overshoot amount adjustment value and the setting time adjustment value exceed the allowable values, the setting of the allowable values are too strict, so that the allowable values are reset in the lessening direction in S409.

Figure 10:
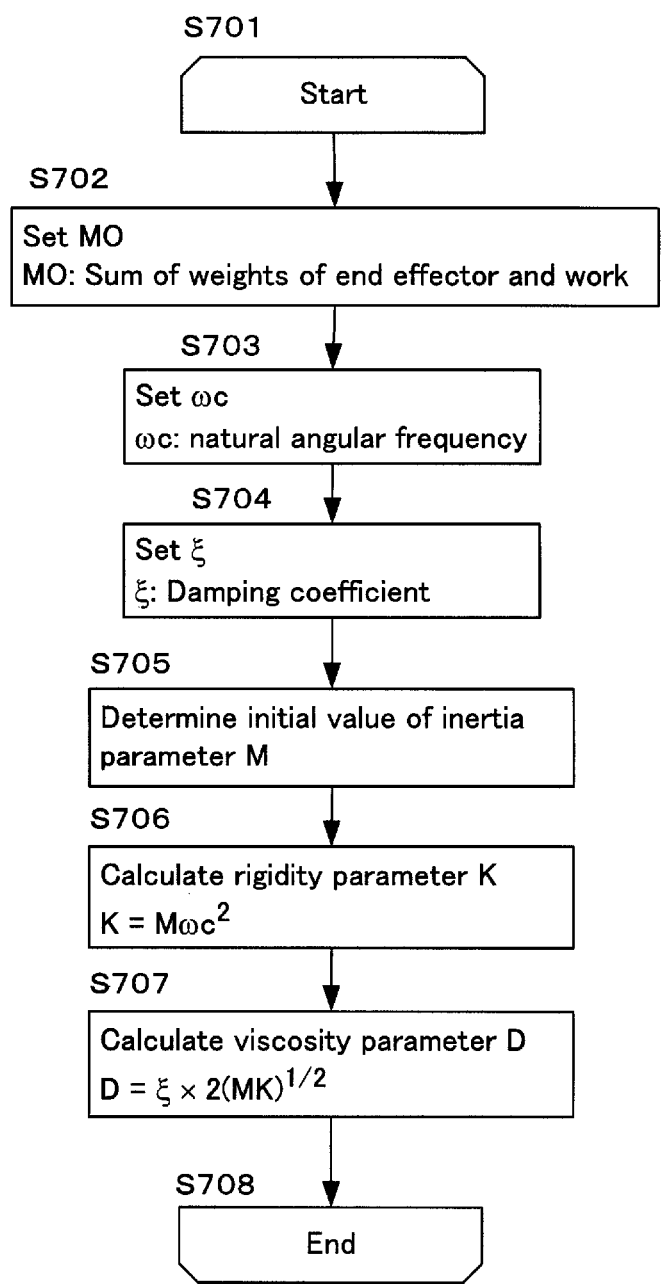
FIG. 10 is a flowchart of a calculator of an initial parameter of the present invention.

FIG. 10 is a flowchart of the calculator of the initial parameters. The initial values of the inertia parameter M and the viscosity parameter D determined by the calculator of the initial parameters are set in the initial value setting in S201 in the method of adjusting the parameters in the impedance control.

In S702, the sum MO of weight of the end effector and the gripped workpiece is set. In S703, the band ωc of the positional control system of the robot is set. In S704, the damping coefficient ζ is set. In S705, the sum MO of the weight of the end effector and the gripped workpiece set in S702 is determined as the initial value of the inertia parameter M at the time of adjustment. In S704, the rigidity parameter K is calculated by the following equation using the inertia parameter M determined in S705 and the band ωc of the positional control system of the robot which is set in S703.

$$K = M(\omega c)^2 \quad (5)$$

In S707, the initial value of the viscosity parameter D at the time of adjustment is calculated by the following equation using the inertia parameter M determined in S703, the rigidity parameter K determined in S704, and the damping coefficient set in S704.

$$D = \zeta \times 2(MK)^{1/2} \quad (6)$$

As described above, according to the present invention, initial values of the inertia parameter and the viscosity parameter at the time of adjustment are automatically set, the calculation direction and the calculation width of the viscosity parameter are automatically adjusted according to increase/decrease in the number of vibration times and the setting time of the force response at the time of pressing, and the calculation direction and the calculation width of the inertia parameter are automatically adjusted according to the adjustment values of the overshoot amount and the setting time. There is consequently an effect that optimum parameters can be always adjusted in short time is produced.

According to the apparatus and method for adjusting parameters of impedance control of the present invention, optimum impedance control parameters can be adjusted according to a target work (assembling work, burr removing work, or the like), a target workpiece (material), and a robot (including an end effector).

Obviously, numerous modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An apparatus for adjusting an inertia parameter and a viscosity parameter of an impedance controller based on information of a force sensor provided for an end effector of a robot manipulator, the apparatus comprising:
    a controller configured to be electrically connected to the force sensor and the robot manipulator, the controller being programmed to provide:
        a parameter initial value calculator configured to calculate initial values of the inertia parameter and the viscosity parameter which are set at a time of parameter adjustment;
        a force reference impression device to repeatedly supply a stepwise force reference to the impedance controller to repeatedly press a workpiece held by the end effector against a target workpiece;
        an evaluation data measurement device configured to record a time response of a force feedback from the force sensor each time the workpiece is pressed and configured to automatically measure a setting time of the time response of the force feedback, an overshoot amount of the time response of the force feedback, and a number of vibration times of the time response of the force feedback;
        an allowable value setting device configured to set an overshoot amount allowable value as a maximum value of an allowable overshoot amount and a setting time allowable value as a maximum value of an allowable setting time;
        a viscosity parameter calculator configured to calculate the viscosity parameter with which the setting time is shortest;
        an end determining device configured to determine whether a calculating process of the viscosity parameter calculator is finished or continued by respectively comparing the setting time and the overshoot amount which are obtained from the evaluation data measurement device with the setting time allowable value and the overshoot amount allowable value; and
        an inertia parameter calculator configured, in the case where the end determining device determines that the calculating process is continued, to change the inertia parameter or to lessen at least one of the overshoot amount allowable value and the setting time allowable value, the viscosity parameter calculator being configured to calculate the viscosity parameter with which the setting time is shortest by executing a repetitive pressing of the force reference impression device in a state where the inertia parameter is fixed, the viscosity parameter calculator being configured to recalculate the viscosity parameter after the inertia parameter calculator changes the inertia parameter or lessens at least one of the overshoot amount allowable value and the setting time allowable value.

2. The apparatus for adjusting parameters of impedance control according to claim 1, wherein the evaluation data measurement device is configured to set, as the setting time, a time period for which the time response of the force feedback is converged within a setting range whose upper and lower limits are designated using a value of the stepwise force reference as a center of the setting range.

3. The apparatus for adjusting parameters of impedance control according to claim 2, wherein the evaluation data measurement device is configured to alternately measure a number of times at which the time response of the force feedback exceeds the setting range as a first number of times and a number of times at which the time response of the force feedback is below the setting range as a second number of times, and is configured to set a sum of the first number of times and the second number of times as the number of vibration times.

4. The apparatus for adjusting parameters of impedance control according to claim 1,
    wherein the viscosity parameter calculator increases the viscosity parameter in the case where the number of vibration times exceeds a preset first threshold, and
    wherein the viscosity parameter calculator decreases the viscosity parameter in the case where the number of vibration times is below a preset second threshold.

5. The apparatus for adjusting parameters of impedance control according to claim 4,
    wherein the viscosity parameter calculator inverts a direction of calculating the viscosity parameter and reduces a calculation width at a preset ratio in the case where the setting time becomes longer than that of last time when the number of vibration times is equal to or larger than the second threshold and is equal to or less than the first threshold, and
    wherein the viscosity parameter calculator finishes the calculating process when an amount of change from the last time of the setting time becomes equal to or less than a preset threshold.

6. The apparatus for adjusting parameters of impedance control according to claim 1,
    wherein the end determining device determines end of the calculating process only in the case where the overshoot amount is equal to or less than the overshoot amount allowable value and the setting time is equal to or less than the setting time allowable value, and
    wherein the end determining device determines continuation of the calculating process in the other cases.

7. The apparatus for adjusting parameters of impedance control according to claim 1,
    wherein the inertia parameter adjusting device decreases the inertia parameter and recalculates the viscosity parameter in the case where the overshoot amount is equal to or less than the overshoot amount and the setting time is larger than a setting time allowable value,
    wherein the inertia parameter adjusting device increases the inertia parameter and recalculates the viscosity parameter in the case where the overshoot amount is larger than the overshoot amount allowable value and the setting time is equal to or less than the setting time allowable value, and
    wherein the inertia parameter adjusting device lessens at least one of the overshoot amount allowable value and the setting time allowable value and recalculates the viscosity parameter in the case where the overshoot amount is larger than the overshoot amount allowable value and the setting time is larger than the setting time allowable value.

8. The apparatus for adjusting parameters of impedance control according to claim 1, wherein the parameter initial value calculator is configured to calculate the initial values of the inertia parameter and the viscosity parameter based on weight of the end effector, weight of a workpiece held by the end effector, and a band of a positional control system of the robot manipulator.

* * * * *